(12) United States Patent
Kreutzer et al.

(10) Patent No.: US 10,968,992 B2
(45) Date of Patent: Apr. 6, 2021

(54) BALL SCREW DRIVE

(71) Applicant: SCHAEFFLER TECHNOLOGIES AG & CO. KG, Herzogenaurach (DE)

(72) Inventors: Mario Kreutzer, Sonneberg (DE); Gerd Sanewski, Erlangen (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 381 days.

(21) Appl. No.: 15/747,796

(22) PCT Filed: Jul. 14, 2016

(86) PCT No.: PCT/DE2016/200323
§ 371 (c)(1),
(2) Date: Jan. 26, 2018

(87) PCT Pub. No.: WO2017/020900
PCT Pub. Date: Feb. 9, 2017

(65) Prior Publication Data
US 2018/0216711 A1    Aug. 2, 2018

(30) Foreign Application Priority Data
Aug. 4, 2015    (DE) .......................... 102015214856.4

(51) Int. Cl.
*F16H 25/22*    (2006.01)
(52) U.S. Cl.
CPC ................ *F16H 25/2223* (2013.01)
(58) Field of Classification Search
CPC ............. F16H 25/2223; F16H 25/2214; F16H 25/2219
See application file for complete search history.

(56) References Cited

U.S. PATENT DOCUMENTS 2,833,156 A * 5/1958 Spontelli ............. F16H 25/2223
74/424.84
2,833,157 A * 5/1958 Gates .................. F16H 25/2204
74/424.87
(Continued)

FOREIGN PATENT DOCUMENTS

| CN | 101052826 A | 10/2007 |
| CN | 102906457 A | 1/2013 |

(Continued)

OTHER PUBLICATIONS

Translation of JP H6-45149 which was provided and without translation (Year: 1994).*

(Continued)

*Primary Examiner* — William Kelleher
*Assistant Examiner* — Gregory T Prather
(74) *Attorney, Agent, or Firm* — Brooks Kushman P.C.

(57) ABSTRACT

A ball screw drive, comprising a screw that includes at least one outer ball groove, and a threaded nut that includes at least one inner ball groove, wherein the inner and outer ball grooves combine to form a ball channel in which one or more balls are accommodated, wherein at least one pocket is formed in the threaded nut, in which a deflection element is accommodated for deflecting the balls rolling in the ball groove, wherein the deflection element includes a deflection body, on which an intake and discharge section are formed and open into the ball groove to enable the one or more balls to enter and exit the groove, and wherein the intake and discharge section includes a snaking bath that enables the ball to be moved from one ball groove section into an adjacent ball path section.

19 Claims, 6 Drawing Sheets

(56) References Cited

U.S. PATENT DOCUMENTS

| | | | | |
|---|---|---|---|---|
| 3,198,029 | A | * | 8/1965 | Orner .................. F16H 25/2209 74/424.87 |
| 3,372,605 | A | * | 3/1968 | Orner .................. F16H 25/2209 74/89.42 |
| 3,393,576 | A | * | 7/1968 | Burnette ............. F16H 25/2209 74/89.42 |
| 4,274,297 | A | * | 6/1981 | Blurock .............. F16H 25/2209 74/424.86 |
| 4,612,817 | A | * | 9/1986 | Neff .................... F16H 25/2204 74/424.75 |
| 4,658,939 | A | | 4/1987 | Kircher et al. |
| 4,677,869 | A | * | 7/1987 | Mayfield ............. F16H 25/2219 74/424.83 |
| 4,905,534 | A | * | 3/1990 | Andonegui ......... F16H 25/2223 74/424.87 |
| 5,937,700 | A | * | 8/1999 | Brown ................ F16H 25/2223 74/424.86 |
| 6,454,042 | B1 | * | 9/2002 | Yoshida .............. B62D 5/0448 180/444 |
| 9,091,336 | B2 | * | 7/2015 | Lin ..................... F16H 25/2214 |
| 2002/0003059 | A1 | * | 1/2002 | Yoshioka ............ B62D 5/0448 180/444 |
| 2002/0063014 | A1 | * | 5/2002 | Yoshida ............... F16D 1/0858 180/444 |
| 2004/0045388 | A1 | * | 3/2004 | Sugita ................ F16H 25/2223 74/424.87 |
| 2005/0000309 | A1 | | 1/2005 | Perni et al. |
| 2013/0239725 | A1 | * | 9/2013 | Miyazaki ............ F16H 25/2223 74/424.86 |
| 2016/0273633 | A1 | * | 9/2016 | Heck ................... F16H 25/2223 |
| 2017/0227098 | A1 | * | 8/2017 | Iwasaki ............... F16H 25/2219 |
| 2018/0209521 | A1 | * | 7/2018 | Kreutzer ............. F16H 25/2223 |
| 2018/0216711 | A1 | * | 8/2018 | Kreutzer ............. F16H 25/2223 |
| 2019/0186606 | A1 | * | 6/2019 | Schadlich ........... F16H 25/2214 |
| 2019/0277380 | A1 | * | 9/2019 | Oswald ................ F16D 65/28 |

FOREIGN PATENT DOCUMENTS

| | | |
|---|---|---|
| CN | 104295668 A | 1/2015 |
| DE | 8108413 U1 | 7/1981 |
| DE | 102006055300 A1 | 6/2007 |
| DE | 102006037339 A1 | 2/2008 |
| DE | 102013106814 A1 | 7/2014 |
| EP | 2532924 A1 | 12/2012 |
| GB | 2400156 A | 10/2004 |
| JP | H0645149 U | 6/1994 |
| JP | 2012082921 A | 4/2012 |
| JP | 2014059032 A | 4/2014 |
| WO | 03083328 A1 | 10/2003 |

OTHER PUBLICATIONS

International Search Report for International Application No. PCT/DE2016/200323 dated Nov. 3, 2016, 7 pages.

* cited by examiner

BALL SCREW DRIVE

CROSS-REFERENCE TO RELATED APPLICATIONS

This application is the U.S. National Phase of PCT/DE2016/200323 filed Jul. 14, 2016, which claims priority to DE 102015214856.4 filed Aug. 4, 2015, the entire disclosures of which are incorporated by reference herein.

TECHNICAL FIELD

The disclosure relates to a ball screw drive, comprising a lead screw that has at least one outer ball groove, and a threaded nut that has at least one inner ball groove, the ball grooves being combined to form a ball channel in which balls are accommodated, via which the lead screw is guided in relation to the threaded nut, wherein at least one radially closed pocket is formed in the threaded nut, in which a deflector element is accommodated for deflecting the balls rolling in the ball groove.

BACKGROUND

Ball screw drives are used in general to convert a rotational movement into a translational movement (displacement). For this, either the screw or the nut is connected to a drive, e.g. an electric motor, if applicable, via an intermediate gearing. When the screw is rotated by the drive, the nut, connected to the screw via the balls disposed in the tracks, is displaced axially, thus longitudinally on the screw. If instead, the nut is coupled to the drive, and rotated therewith, the screw is displaced axially by the rotating nut, which is in a fixed position.

Numerous deflector bodies are normally disposed on the nut, by means of which the balls are transferred. For this, the nut has numerous holes, normally offset along the circumference, into which the deflector bodies, normally made of plastic, are inserted. The balls rolling in the ball channel between the lead screw and the threaded nut pass through an intake opening into the deflector body, pass through the deflector body into a corresponding channel or guide section, and exit through a discharge opening into an adjacent section of the ball channel. In this manner, closed ball circuits are formed.

If the threaded nut is driven, it may be supported in an appropriate manner, such that it can be coupled to the drive. Because the nut wall is interrupted at numerous points by holes in which the deflector bodies are accommodated, a cylindrical ring may be placed on the outside of the nut, via which the nut is supported. Alternatively, the nut can also be elongated axially, in order to implement the bearing and coupling possibility in the elongated region.

Ball screw drives are known from DE 10 2013 106 814 A1 and DE 81 08 413 U1, in which the threaded nut has an inner recess in which an elongated deflector element is disposed, extending over numerous windings of the ball groove in the nut, which have numerous adjacent deflecting sections. As an alternative to the use of such a deflector element, it is also possible to place numerous separate deflector elements axially adjacent to one another. With the drive known from DE 10 2013 106 814 A1, the deflector element is secured in place via fastener screws, which are screwed through the nut into the deflector element. With the drive from DE 81 08 413 U1, the recess and the deflector element are conceived such that the balls are guided in sections along the base of the pocket, i.e. they roll directly on the pocket base.

SUMMARY

The disclosure addresses the problem of creating a better ball screw drive.

The ball screw drive comprises a lead screw that has at least one outer ball groove, and a threaded nut that has at least one inner ball groove. The ball grooves are helically wound about the screw axis. The ball grooves are combined to form a ball channel in which the balls are accommodated. Numerous radially closed pockets are formed in the ball groove of the threaded nut, each of which accommodates a deflector element for deflecting the balls rolling in the ball groove from one channel section into the adjacent channel section, such that circulating, closed ball lines are formed. In other words, numerous continuous ball channels are formed, in which the ball can circulate continuously, wherein a deflector element connects a beginning with an end of the same winding of the continuous ball channel. There is an integral functional surface on the outside of the threaded nut, wherein an axial position of one of the pockets is aligned at least in part with the axial position of the functional surface. In this manner, a ball screw drive is created with smaller axial dimensions.

The threaded nut of the ball screw drive according to the disclosure has one, or normally more, pockets on its inner surface, which are closed radially and thus not formed as through holes. Thus, the outer surface of the threaded nut may be closed, and may therefore not be interrupted. The one or more pockets are formed in the ball grooves of the threaded nut such that a deflector element accommodated in the pocket is positioned with its intake and discharge in relation to the ball groove, such that the balls can be transferred accordingly, via the respective deflector element.

Because the outer surface of the threaded nut is closed, it is possible according to the disclosure to form the functional surface as an integral part of the outer surface, thus as an integral part of the threaded nut. The prior attachment of a supplementary component with such a geometry is advantageously no longer necessary.

In a preferred development of the disclosure, the functional surface can form the bearing geometry serving as the rotational bearing for the threaded nut, or the drive geometry serving as the drive for the threaded nut, or as a sliding surface. In any case, the at least one pocket for the deflector element axially overlaps the functional surface. This is possible because the pocket is closed radially, and thus does not interrupt the outer coating surface of the threaded nut forming the functional surface in the manner described above.

In a further development of the disclosure, it may be provided that the, or at least one of, the pockets, seen axially, is positioned such that its axial position is aligned with the axial position of the bearing or drive geometry formed as an integral part of the outer surface of the threaded nut. Because the outer surface of the threaded nut is closed, due to the shape of the pockets, as described above, it is possible to form an integral bearing or drive geometry thereon. This bearing or drive geometry is positioned according to the disclosure such that it is aligned, at least partially, potentially entirely, with the axial position of the pocket, and thus also provides a radial covering. The nut can therefore be short, seen axially, such that the axial positions of the pockets and the bearing or drive geometry are aligned. A previously necessary axial extension of the threaded nut is advantageously no longer needed here. In this manner, a very compact construction of the threaded nut is obtained.

The bearing geometry, formed as an integral part on the outer surface of the nut, may be a roller groove of a support bearing that supports the threaded nut such that it can rotate therein. Ultimately, the inner annular support bearing, formed by the roller groove, may be formed as an integral part on the outer surface of the nut.

An integral drive geometry can be an annular gear, for example, formed on the outer surface of the nut. This annular gear mesh with a drive pinion, for example, or with a drive belt, thus various drive elements, by which the threaded nut may be driven.

In the simplest case there is just one pocket and one deflection element, meaning that the nut as a whole is very short, seen axially. There are normally numerous deflection elements, however, i.e., numerous radially closed pockets are formed on the inside of the threaded nut, each of which accommodates a deflection element. At least one of the pockets is disposed at an axial position, which is aligned with the radially outer bearing or drive geometry position. When the drive geometry is formed as an annular gear that couples toothed belts, for example, then it can be somewhat longer than the pocket, seen axially, wherein numerous pockets, seen axially, may lie on the outside of the nut, congruently to this drive geometry. If there are numerous pockets, they may be offset to one another on the circumference. If there are three pockets, they are offset to one another at 120° on the circumference.

The, or each, deflection element is to be secured accordingly in the pocket. Beside the possibility of attaching the deflection element in the pocket via an adhesive connection, a clamping retention of the deflection element in the pocket is preferred. Because the pocket, or the respective pocket, is also axially delimited after it has been recessed into the ball groove of the threaded nut, a corresponding clamping retention of a deflection element can be obtained without difficulty.

Although the deflection element can be dimensioned accordingly, seen geometrically, for such a clamping retention, such that it can be pressed securely into the pocket when fitting the threaded nut therewith, in an important useful further development of the disclosure, at least one elastic clamping section can be formed on one or both sides, which bears in a clamping manner on one or both of the walls axially delimiting the pocket. An appropriate clamping of the deflection element is ensured via such an elastic element, which can be designed as a flexible tab protruding laterally, for example. If there is such a clamping element, it bears with a corresponding pre-tension against a pocket wall such that the deflection element bears against the opposite pocket wall with its element body. If such clamping sections are provided on both sides, then they each bear against opposite pocket walls with a corresponding pre-tension.

In a further development of the disclosure, the width of the pocket, seen axially, can expand toward the base of the pocket. Thus, the pocket may overhang, at least in part, as can be obtained, for example, through a trapezoidal expansion toward the base of the pocket. Because the deflection element may be clamped in place in the pocket, as described above, a good radial securing of the deflection element is also obtained via this overhanging pocket geometry.

In a further development of the disclosure, the deflection element can have two circumferential centering sections, which engage in adjacent sections of the ball groove. These centering sections enable a precise positioning of the deflection body in relation to the ball groove of the threaded nut. Centering sections of this type are not absolutely necessary, however, if the deflection element is equipped with one or two elastic clamping sections, this may provide an axial centering.

In order to be able to make the threaded nut even shorter, it is provided in a further development of the disclosure that the at least one pocket, or one of the pockets (in particular those pockets that are aligned axially with the bearing or drive geometry), is open at the end surface of the threaded nut, and has a local radial recess, in which a radial projection of the deflection element engages. Thus, the pocket may be disposed directly adjoining the end surface of the nut, and is open toward the end surface, thus being closed axially on only one side. To axially secure the deflection element, the pocket has a local radial recess, such that a corresponding bearing web is formed, extending to the end surface. A corresponding radial projection of the deflection element engages in this radial recess. This projection bears on the bearing web such that, in turn, the deflection element is secured axially. The deflection element is otherwise exposed at the end surface of the threaded nut.

Alternatively to the formation of such a local radial recess in the base of the pocket and a corresponding projection on the deflection element, it is also conceivable to place an annular retention element on the threaded nut in the region of the end surface, thus a type of snap ring, or the like, which basically closes the pocket and secures the deflection element axially. In this case, neither the pocket nor the deflection element need to be designed accordingly, but instead, there only needs to be an appropriate securing possibility for the annular retention element, e.g. a notch or hole formed therein, wherein this retention notch or hole may be formed in the end surface of the nut, so that the deflection element can be disposed with its end flush with the end surface.

If there are numerous axially spaced apart and circumferentially offset pockets, it is fundamentally conceivable to form a pocket that is open on each axial end surface of the nut, such that the respective deflection element is axially secured via one of the retention alternatives described above, exposed at its end, flush with the end surface.

Such a ball screw drive according to the disclosure can be used in particular as part of an electromechanical actuator, e.g. for steering a motor vehicle.

BRIEF DESCRIPTION OF THE DRAWINGS

The disclosure shall be explained below on the basis of exemplary embodiments, with reference to the drawings. The drawings are schematic illustrations, wherein.

DETAILED DESCRIPTION

Figure 1:
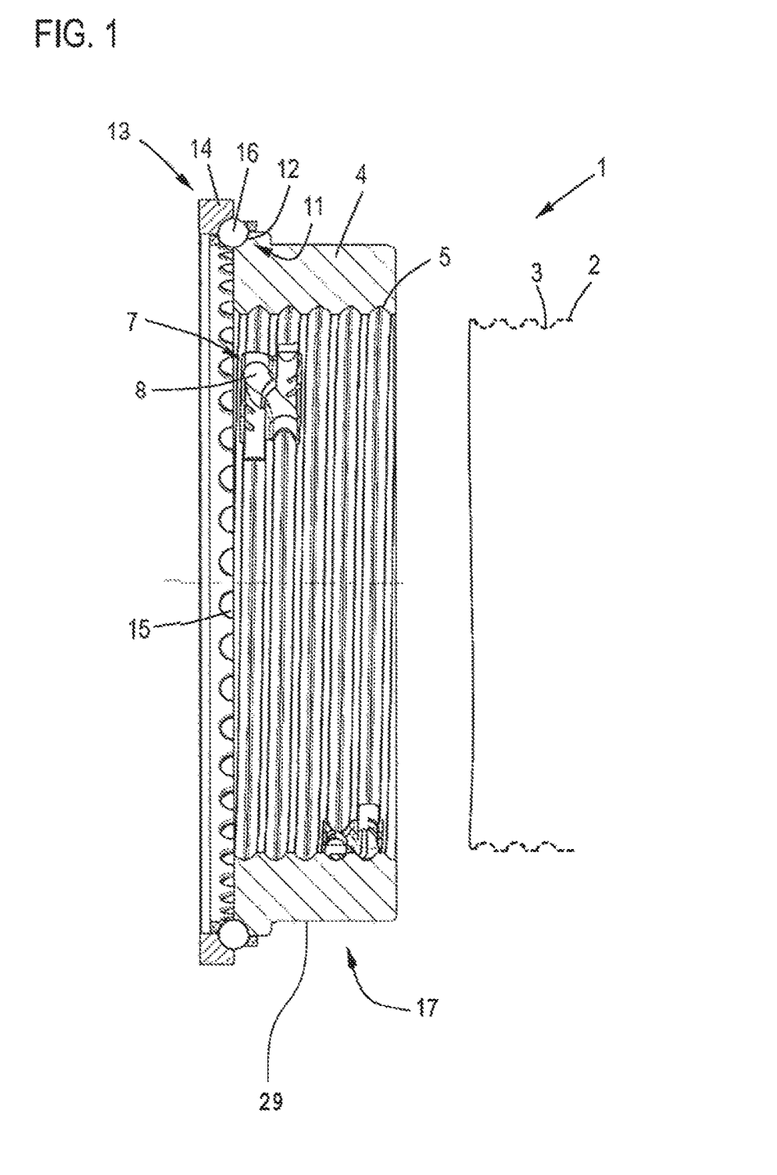
FIG. 1 shows a ball screw drive according to the disclosure, which has a lead screw indicated by a broken line, and a threaded nut, shown in a cutaway view.

FIG. 1 shows the ball screw drive 1 according to the disclosure, comprising a lead screw 2, illustrated with a broken line, that has a ball groove 3 formed on the outside, and a threaded nut 4 that has a ball groove 5 formed on the inside. The ball grooves 3 and 5 collectively form a ball channel in the known manner, in which balls 6 roll (see FIG. 4).

Numerous pockets are formed on the inside of the threaded nut 4, thus in the ball groove 5, each of which accommodates a deflection element 8, which serves to deflect the balls 6 from one channel section into the adjacent channel section, such that circulating closed ball lines are formed. As is shown in FIG. 3, the three deflection elements 8 provided therein, and thus their pockets 7, are positioned along the circumference such that they are offset to one another by 120°, and are each disposed at different axial positions.

Figure 3:
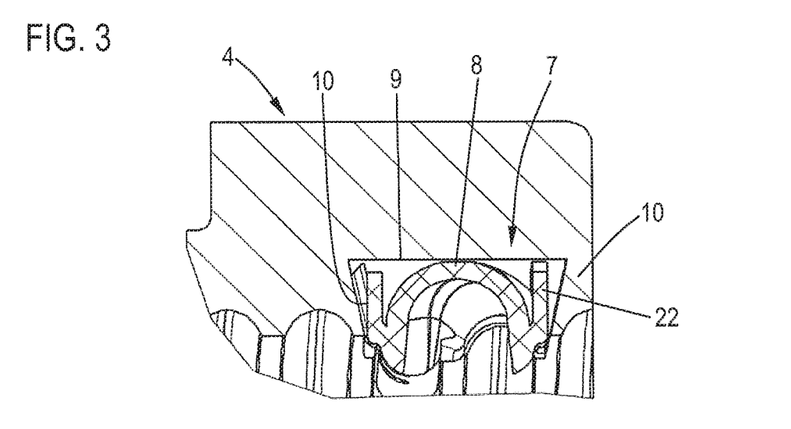
FIG. 3 shows an enlarged detail view of the region of a pocket together with the deflection element accommodated therein.

Each pocket 7 may be closed radially, see FIG. 3 in this regard, i.e. it may only extend to the outer surface of the nut. The pocket 7 is thus delimited by a base 9 and two lateral walls 10, and is thus also closed axially.

At least one of the pockets 7, and thus the deflection element 8 accommodated therein, is congruent, at least in sections, in terms of its axial position, to a bearing geometry 11 formed on the outer surface of the threaded nut 4, which is designed here as a roller groove 12, which forms the inner ring of a journal bearing 13, via which journal bearing 13, the threaded nut 4 is supported on a third element, such that it can rotate. The journal bearing 13 comprises a corresponding outer ring 13, as well as corresponding balls 16, accommodated thereon in corresponding ball receivers 15, by way of example, which roll in the roller groove 12. The roller groove 12 is an integral part of the threaded nut 4.

Figure 4:
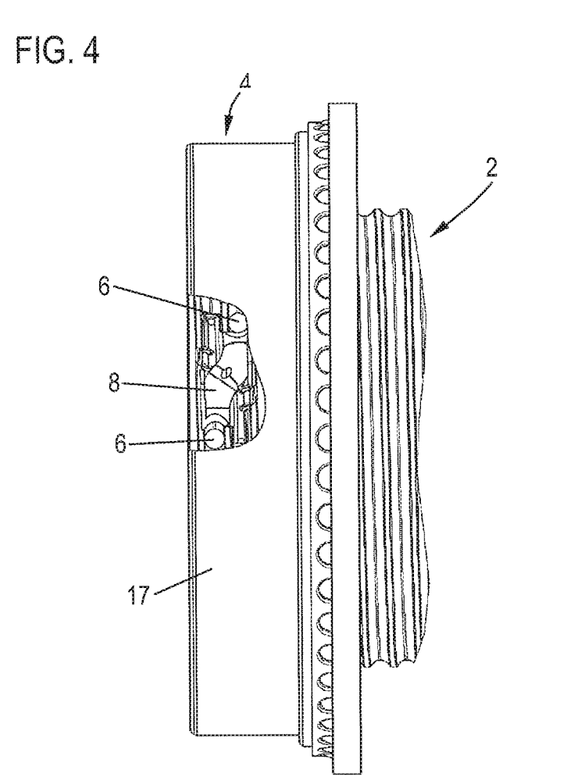
FIG. 4 shows a view of the ball screw drive with a cutaway view of the threaded nut therein.

Instead of such a bearing geometry 11, it is also conceivable to form a drive geometry, e.g. in the form of a circulating annular gear, or the like, for coupling with a drive element, via which the threaded nut 4 is rotated. Such a drive geometry could of course also be formed additionally on the outer surface of the threaded nut 4, because this is closed to the outside, due to the radially closed pocket design, as is shown in FIGS. 1 and 4. Thus, it may also be possible, without difficulty, to form a toothed geometry or the like on the outer surface 17 of the threaded nut 4, for coupling to a toothed belt, for example.

Because the axial position of the bearing geometry 11 shown in FIG. 1 is congruent with the axial position of the pocket 7, at least in sections, it is thus possible to design the threaded nut such that it is short and compact, seen axially. Because of the integral design of the bearing geometry shown therein (and the same also applies with regard to a drive geometry, not shown therein), no additional components, such as annular bearings or annular gears, etc. need to be disposed on the nut to form the bearing geometry.

FIG. 3 shows, as described above, a sectional view, cut through a sub-region of the threaded nut 4. The pocket 7 clearly has a trapezoidal cross section, i.e. its axial width expands toward the base 9 of the pocket. The pocket walls 10 are thus overhanging. This enables a secure clamping of the deflection element 8 in the pocket.

Figure 5:
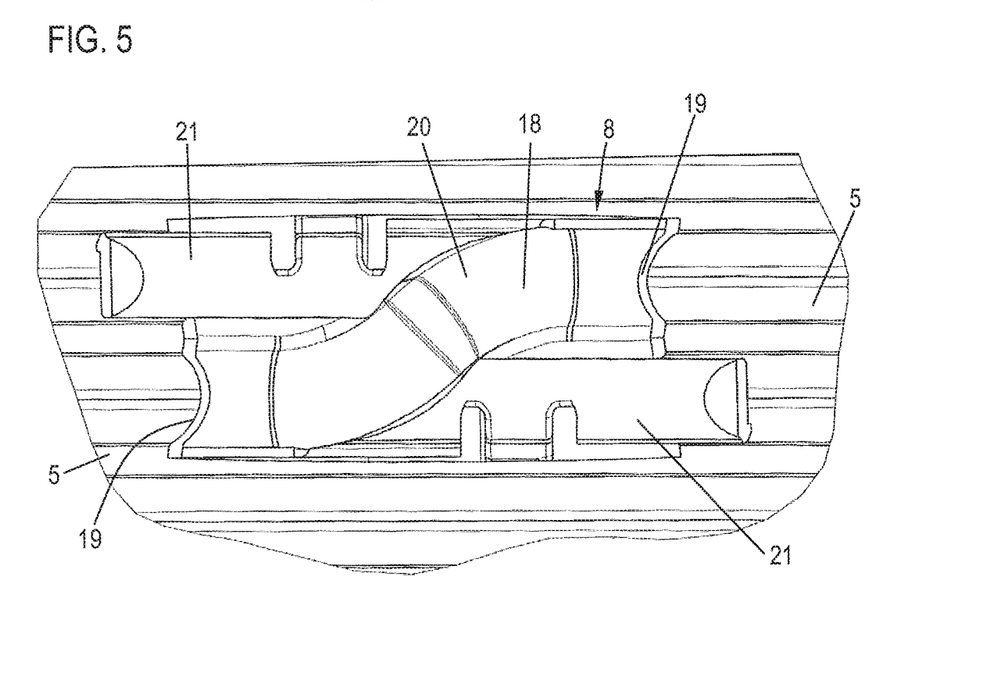
FIG. 5 shows a detail view of a deflection element accommodated in the threaded nut.
Figure 6:
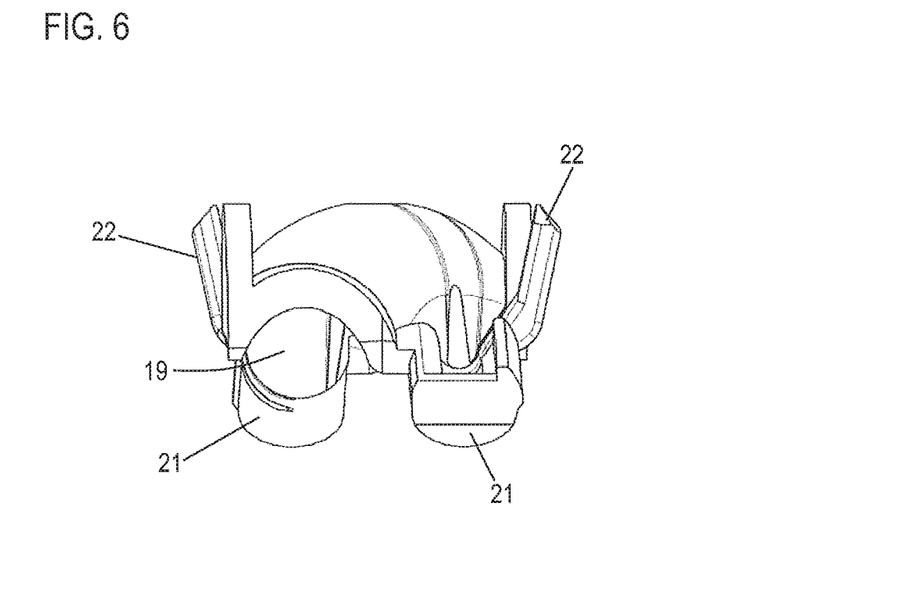
FIG. 6 shows an end view of the deflection element from FIG. 5.
Figure 7:
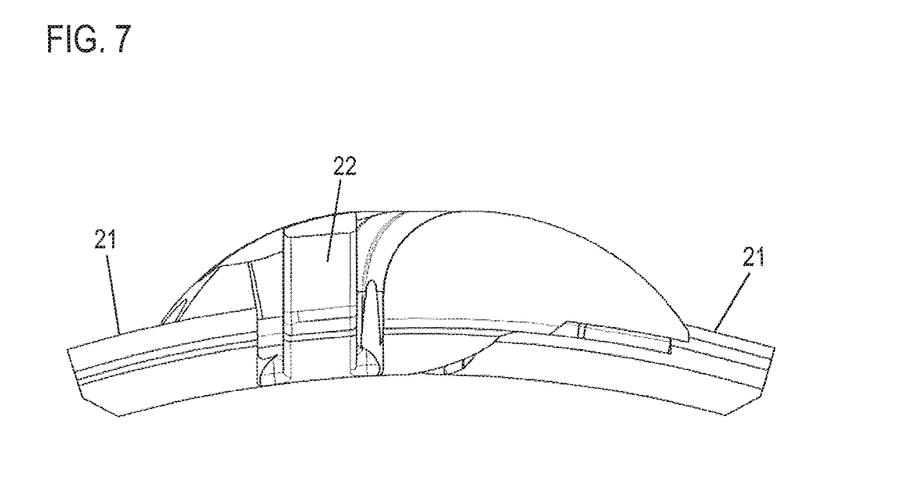
FIG. 7 shows a side view of the deflection element from FIG. 5.

The deflection element 8 itself is shown in FIGS. 5-7 in an enlarged depiction. It includes the actual deflection body 18, on which two intake and discharge sections 19 are formed, each of which opens into the ball groove 5, enabling the balls 6 to enter and exit the groove. A guide or channel section 20 adjoins the intake and discharge sections 19, which has a snaking path, and enables a ball 6 to be moved from one ball groove section into the adjacent ball path section.

Figure 2:
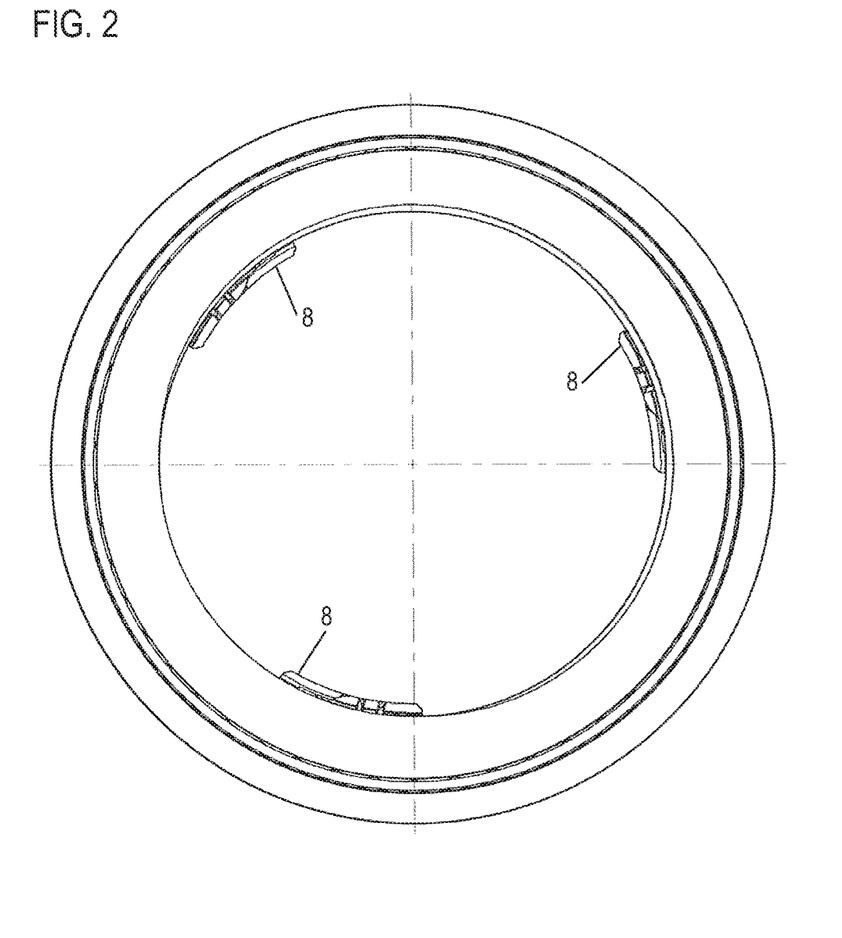
FIG. 2 shows an end view of the threaded nut from FIG. 1.

The deflection body 18 also includes two centering sections 21, which axially center the deflection element 8 in the ball groove. The centering sections 21 likewise engage in the ball groove 5. They are curved, see FIG. 2, naturally conforming to the shape of the ball groove 5.

In order to clamp the deflection element 8 securely in the pocket 7, elastic clamping sections 22 are formed in the illustrated example on both sides of the deflection element 8, which can be formed as elastic tabs, see FIGS. 6 and 7, by way of example. The elastic tabs snap in place behind the overhanging pocket walls 10 when inserted, such that a clamping is obtained, radially securing the deflection element in place.

Figure 8:
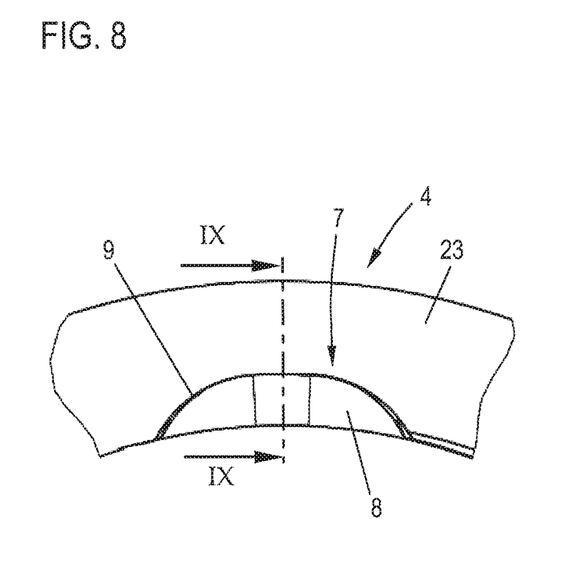
FIG. 8 shows a partial view of the threaded nut, with a pocket that is open at the end surface.
Figure 9:
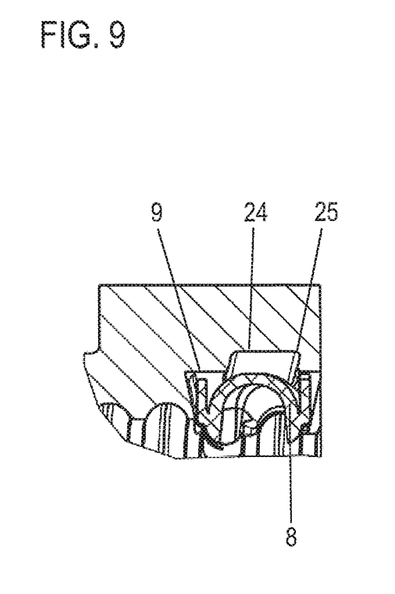
FIG. 9 shows a sectional view through the threaded nut from FIG. 8, cut along the line IX-IX in FIG. 8.
Figure 10:
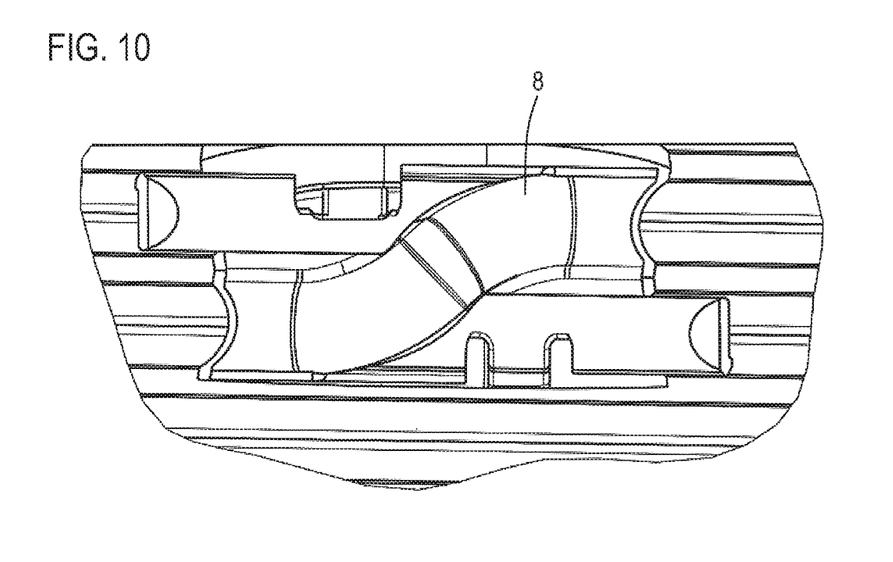
FIG. 10 shows a cutaway view of the threaded nut from FIG. 8.

FIG. 8 shows a partial view in the region of the end surface 23 of a threaded nut 4 in another embodiment. A pocket 7 is also provided here on the inside of the threaded nut, in which the deflection element 8 is accommodated. The pocket 7 is open at the end surface 23, however, see corresponding FIGS. 8-10, such that when the deflection element 8 has been inserted, it is visible at the end surface of the threaded nut 4. In order to secure the deflection element 8 axially, the pocket 7 has a local radial recess 24 in the region of the base 9 of the pocket, in which a radial projection 25 of the deflection element 8 engages. The deflection element 8 is axially secured via this projection engagement. The deflection element 8 is forced axially outward here, until it bears directly on the end edge 23 of the threaded nut 4.

Figure 11:
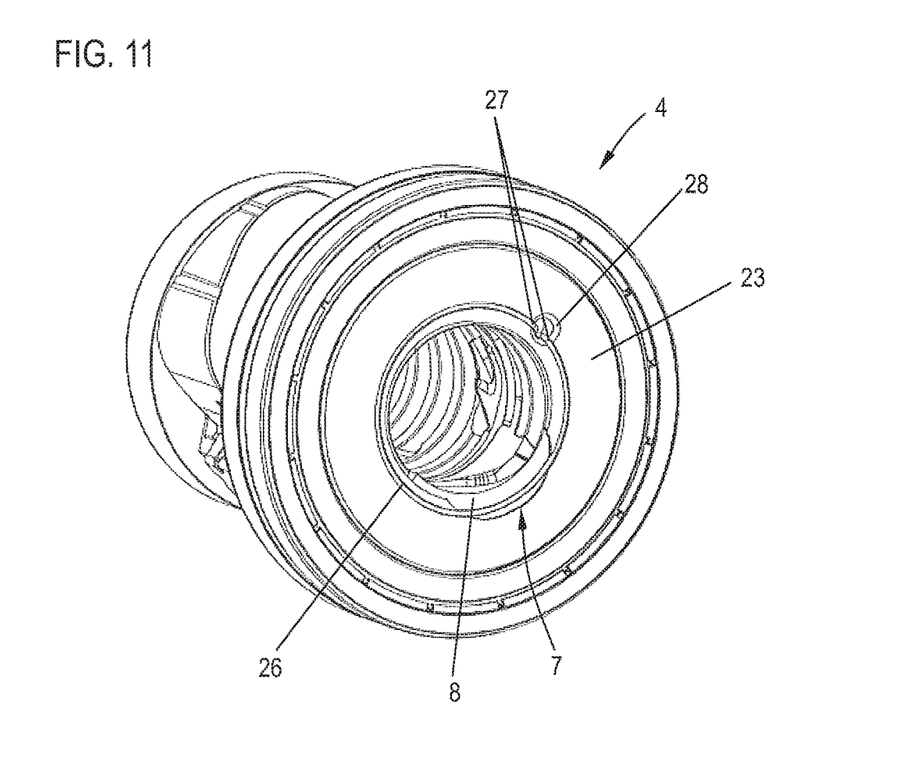
FIG. 11 shows a perspective view of a threaded nut from another embodiment, with pockets that are open at the end surface, and a retention element.

A similar design is provided for the threaded nut 4 shown in FIG. 11. There as well, a pocket 7 is provided on the threaded nut 4, which is open axially at the end surface 23 of the threaded nut 4 here as well. The deflection element 8 is thus also exposed at the end surface 23 here.

In order to axially secure the deflection element 8, an annular retention element 26 is provided, which rolls about the end surface 23 and extends axially over a section of the deflection element 8, as is clearly shown in FIG. 11. The ends 27 of the annular retention element 25, e.g. a metal wire, are inserted into a hole 28 on the end surface 23 of the threaded nut 4, and secured in place. This can also provide an axial securing of the deflection element 8. Alternatively, a wider annular cover can be used instead of the wire element.

LIST OF REFERENCE SYMBOLS 1 ball screw drive
2 lead screw
3 ball groove
4 threaded nut
5 ball groove
6 ball
7 pocket
8 deflection element 9 pocket base
10 pocket wall
11 bearing geometry
12 roller groove
13 journal bearing
14 outer ring
15 ball receiver
16 ball
17 outer surface
18 deflection body
19 intake and discharge section
20 guide or channel section
21 centering section
22 clamping section
23 end surface
24 recess
25 projection
26 retention element
27 end
28 hole
29 Functional Surface

The invention claimed is:

1. A ball screw drive, comprising:
a screw that has at least one outer ball groove, and a threaded nut that has at least one inner ball groove, which ball grooves combine to form a ball channel in which balls are accommodated, wherein a plurality of radially closed pockets are integrally formed in the ball groove on the threaded nut, wherein the plurality of radially closed pockets are delimited by a base and two lateral walls that close the pockets axially, wherein each of the plurality of radially closed pockets accommodates a deflection element for deflecting the balls rolling in the ball groove from one channel section into an adjacent channel section, such that circulating and closed ball lines are formed, wherein an integrally formed functional surface is provided on an outer surface of the threaded nut, wherein the outer surface of the threaded nut is closed, wherein an axial position of one of the pockets is at least partially congruent with the axial position of the functional surface, and wherein the deflection element includes an deflection body, on which an intake and a discharge section are formed, and a guide section adjoining the intake and discharge sections, which has a snaking path and enables a ball to be moved from one ball grove section into an adjacent ball path section.

2. The ball screw drive of claim 1, wherein the functional surface of which is formed as a bearing geometry is at least one of a rotating bearing for the threaded nut, a drive geometry serving as the drive for the threaded nut, or as a sliding surface.

3. The ball screw drive of claim 2, wherein the bearing geometry is a roller groove of a journal bearing rotatably supporting the threaded nut, and in that the drive geometry is an annular gear.

4. The ball screw drive of claim 1, wherein in the deflection element is clamped in place in the pocket.

5. The ball screw drive of claim 4, wherein at least one elastic clamping section is provided on one or both sides of the deflection element, which bears in a clamping manner against the two or more lateral walls axially delimiting the pocket .

6. The ball screw drive of claim 1, wherein a width of the pocket expands toward a base of the pocket.

7. The ball screw drive of claim 6, wherein the pocket expands into a trapezoid.

8. The ball screw drive of claim 1, wherein the deflection element has two circumferential centering sections which engage in adjacent sections of the ball groove.

9. The ball screw drive of claim 1, wherein the plurality of radially closed pockets are provided with deflection elements accommodated therein.

10. A ball screw drive, comprising:
a screw that includes at least one outer ball groove; and
a threaded nut that includes at least one inner ball groove, wherein the inner and outer ball grooves combine to form a ball channel in which one or more balls are accommodated, wherein at least one radially closed pocket is formed in the threaded nut and a deflection element is accommodated in the threaded nut for deflecting the balls rolling in the ball groove, wherein the radially closed pocket is delimited by a base and two lateral walls that close the pockets axially, wherein the deflection element includes a deflection body, on which two intake and discharge sections are formed, wherein the intake and discharge sections open into the ball groove to enable the one or more balls to enter and exit the groove, wherein an integrally formed functional surface is provided on an outer surface of the threaded nut, wherein the outer surface of the threaded nut is closed.

11. The ball screw drive of claim 10, wherein the intake and discharge sections include a snaking path that enables the ball to be moved from one ball groove section into an adjacent ball path section.

12. The ball screw drive of claim 10, wherein one or more elastic clamping sections are formed on both sides of the deflection element, wherein the elastic clamping sections are configured to clamp the deflection element to the pocket.

13. The ball screw drive of claim 12, wherein the one or more elastic clamping sections are elastic tabs.

14. The ball screw drive of claim 13, wherein the elastic tabs are configured to snap into place behind a pocket wall.

15. The ball screw drive of claim 10, wherein the deflection body includes two centering sections configured to axially center the deflection element in the ball groove.

16. The ball screw drive of claim 15, wherein the centering sections are configured to engage in the inner ball groove.

17. The ball screw drive of claim 10, wherein a width of the pocket expands toward the base of the pocket.

18. The ball screw drive of claim 10, wherein an axial position of one of the radially closed pockets is at least partially congruent with the axial position of a functional surface.

19. A ball screw drive, comprising:
a screw that includes at least one outer ball groove; and
a threaded nut that includes at least one inner ball groove, wherein the inner and outer ball grooves combine to form a ball channel in which one or more balls are accommodated, wherein a plurality of radially closed pockets are formed in the ball groove of the threaded nut, wherein the plurality of radially closed pockets are delimited by a base and two lateral walls that close the pockets axially, wherein each of the plurality of radially closed pockets includes a deflection element is accommodated for deflecting the balls rolling in the ball groove, wherein the deflection element includes a deflection body, on which an intake and discharge section is formed and open into the ball groove to enable the one or more balls to enter and exit the groove, and wherein the intake and discharge section includes a snaking path that enables the ball to be moved from one ball groove section into an adjacent ball path section, wherein an integrally formed functional surface is provided on an outer surface of the threaded nut.

\* \* \* \* \*